United States Patent [19]
Townsend

[11] Patent Number: 4,801,172
[45] Date of Patent: Jan. 31, 1989

[54] VEHICLE CLOSURE

[76] Inventor: John A. Townsend, 1053 Vista Grande, Millbrae, Calif. 94030

[21] Appl. No.: 49,001

[22] Filed: May 7, 1987

Related U.S. Application Data

[63] Continuation of Ser. No. 783,837, Oct. 3, 1985, abandoned.

[51] Int. Cl.$^4$ .............................................. B60J 5/06
[52] U.S. Cl. ................................. 296/155; 296/188; 49/40; 70/DIG. 64
[58] Field of Search .............. 296/106, 188, 51, 57 R, 296/146, 151, 155, 216, 220; 70/DIG. 64; 49/100, 40

[56] References Cited

U.S. PATENT DOCUMENTS

| | | | |
|---|---|---|---|
| 2,622,919 | 12/1952 | Scott | 296/155 |
| 2,651,541 | 9/1953 | Surles | 296/155 |
| 2,785,921 | 3/1957 | Barenyi | 296/188 |
| 2,819,114 | 1/1958 | Lake | 296/155 |
| 2,893,727 | 7/1959 | Barnard | 296/106 X |
| 3,567,209 | 3/1971 | Lathers | 296/106 X |
| 3,645,043 | 2/1972 | Velavicius et al. | 296/106 X |
| 3,887,227 | 6/1975 | Deckert | 296/188 |
| 4,090,734 | 5/1978 | Inami et al. | 296/188 X |
| 4,146,021 | 8/1964 | Ericson | 296/106 |
| 4,415,195 | 11/1983 | Furukawa et al. | 296/146 |
| 4,567,636 | 2/1986 | Draper et al. | 296/146 X |

FOREIGN PATENT DOCUMENTS

| | | | |
|---|---|---|---|
| 895409 | 11/1953 | Fed. Rep. of Germany | 296/155 |
| 961405 | 5/1950 | France | 296/155 |
| 1026247 | 4/1953 | France | 296/155 |
| 73938 | 10/1960 | France | 296/216 |
| 1085891 | 10/1967 | United Kingdom | 296/155 |

OTHER PUBLICATIONS

Automotive Industries, vol. 162, No. 8, Aug. 1982, p. 26, Flush Glass Article.

*Primary Examiner*—Dennis H. Pedder
*Attorney, Agent, or Firm*—Limbach, Limbach & Sutton

[57] ABSTRACT

A closure assembly for aerodynamically designed automotive vehicles having body sections with door or displaceable panel apertures formed in generally curved exterior walls and multipart aperture closures such as combinations of solid door panels and windows as well as roof panels which are slidably mounted on the vehicle body section and selectively and rotatably movable within the curved exterior vehicle body wall about the circumference of arcs formed by sections through the exterior wall of the vehicle body between closed and at least partially open positions. Each of the closure parts have a dimension in the direction of rotational movement less than the full dimension of the body aperture so as to be cooperatively capable of filling the body aperture when fully and rotatably extended to a closed position and a unitary reinforcing member on the closure and extending across the aperture to reinforce the body section.

2 Claims, 6 Drawing Sheets

VEHICLE CLOSURE

This application is a continuation of application Ser. No. 783,837, filed on 10-3-85, now abandoned.

BACKGROUND OF THE INVENTION

The present invention relates to a novel closure assembly for vehicles such as automobiles, and more particularly to vehicle aperture closure assemblies such as multi-part doors and displaceable roof sections for apertures formed in a generally curved exterior wall.

Automotive vehicles are typically rectangular in cross section with doors hinged along their front or leading vertical edges so that their rear vertical edges project outwardly when their doors are open. This type of door has proven to be very dangerous and troublesome in the modern driving environment. For example, the structural integrity of such doors is limited and they may open on impact when the vehicle is in an accident, thus placing the occupants of the vehicle and other persons in danger. Even during normal use, when a conventional door is opened carelessly, the safety of occupants of other passing vehicles, motorcyclists and bicyclists is jeopardized. Furthermore, vehicles having these doors must be parked at a substantial distance from one another to allow occupants to comfortably enter and exit from their vehicles, and to protect neighboring vehicles from dents, scratches or other types of damage.

Presently, designers in the automotive industry are modifying the conventional rectangular-shaped vehicle with outwardly opening doors in favor of aerodynamically designed vehicles. These new vehicles have rounded sides and have cross sections that resemble aircraft fuselages. Efforts to modernize door assemblies to complement the new shapes have assumed a variety of forms, such as the Bertone doors which slide forward, the "gull wing" doors pioneered by Mercedes and used on the Delorean which rotate outwardly about the door's top edge and the unusual doors of the Lamborghini Countach which pivot vertically about the top forward edge of the door. These doors, however, only exist in show cars and certain limited production sports cars.

Vertically slidable vehicle doors for motor vehicles wherein the cross-section of the body is in the form of a curve with the doors slidable up to the top part of the body when the doors are to be opened have been suggested, for example, in expired U.S. Pat. No. 2,819,114 to Lawrence Lake. In the Lake patent, while the vehicle body is constructed with a curved upper part and has doors which are similarly curved, they are required to overlap each other when in the open position so as to facilitate entry and discharge of passengers. The requisite substantial vertical extent intended to fill the vertical extent of door opening when closed and yet permit entry and exit from the vehicle places a substantial structural constraint on the vehicle body design. For example, the doors must move upwardly into the roof section in contrast to downwardly in some location under the vehicle to avoid an inordinately high interior floor arrangement. Further, the vehicle roof must be of a curvature generally conforming to and an extension of that of the exterior side walls restricting the vehicle body to a substantially tubular configuration. The requisite overlapping relation of the doors and related track structure occupies an inordinately large overhead cavity within the overhead vehicle body or roof, weakening its structural integrity, significantly reducing and restricting headroom within the vehicle and at the same time necessitating an exterior vehicle height substantially greater than the vehicle door opening.

In light of the problems with the conventional outwardly opening door and the new aerodynamic designs of vehicles, it is an object of the present invention to provide an improved closure assembly to be used on vehicles which will provide an inexpensive, safe, and trouble-free means for entry and exit from a vehicle which is compatible with the designs of the new vehicles and yet overcomes the limitations of earlier proposals.

SUMMARY OF THE INVENTION

In accordance with the present invention, the entry and discharge of passengers through rotary safety doors for a vehicle is facilitated without the concomitant adverse constraint of the prior art on design criteria and structural integrity.

More particularly, a multi-part aperture closure means is slidably mounted on a generally curved exterior side wall of a vehicle body and is selectively and rotatably movable within the curved exterior body wall about the circumference of one or more arcs formed by sections through the exterior body wall between closed and at least partially open positions with respect to the aperture, which may be a door opening or combination of a door and roof panel opening. Each of the closure means parts, such as a door panel, a window conventionally movable from within the door panel to an extended position outwardly of the door panel and otherwise unsupported and separable roof panels are of dimensions in the direction of rotational movement less than the full dimension of the curved body aperture, yet of dimensions cooperatively capable of filling the body aperture when fully and rotatably extended within the aperture.

In alternative embodiments of the invention, the window may be separately and slidably movable out of the aperture in a rotational direction opposite to the direction of withdrawal of the door panel.

In yet further alternative embodiments of the invention, slidable roof panels may be rotated downwardly, for example, to a position in overlying relation to the door panel, and then selectively further withdrawn from the aperture in conjunction with the movement of the door panel.

In a preferred embodiment of the invention involving a door panel and a window, the door panel is selectively and rotatably dropped through an arc determined by chassis mounted track means from a door closed position within the aperture formed in the generally curved vehicle side wall to a door open position on the underside of the vehicle body. The window is absorbed into the door panel either prior to or coincident with the withdrawal of the door panel from the aperture.

Depending upon the design configuration and thickness of the door panel, the window part of the aperture closure means may be configured as a curved surface lying in substantially the same rotational arc as the door panel or may have a different radius of curvature including the possibility of a conventional flat plane window.

Unlike the door panel part of the aperture closure means, which is constrained to rotationally move in a path determined by the chassis or body mounted track members or the like, the window part is separately constrained and movable with the door panel in any suitable conventional manner.

For a more complete understanding of the invention, its operating advantages and specific objects attained by its use, reference should be made to the accompanying figures of the drawings and descriptive matter in which there are illustrated preferred embodiments of the invention.

DESCRIPTION OF THE PREFERRED EMBODIMENTS

In accordance with an exemplary embodiment of the present invention, a door is provided which remains generally flush with the body of the vehicle in its progression from a closed position to an open position along guide rails.

Figure 1:
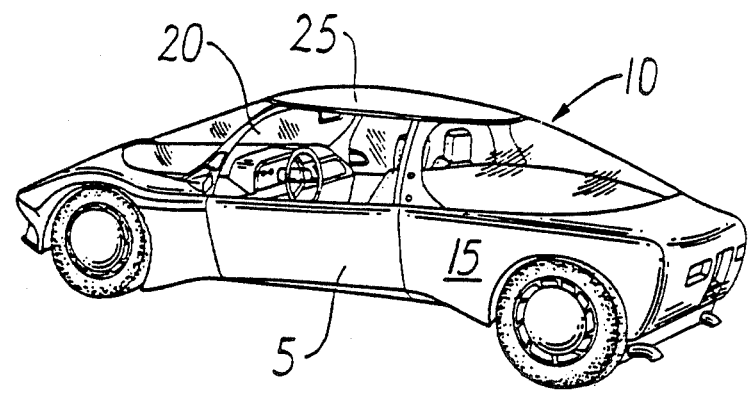
FIG. 1 is a perspective side view of a vehicle with a safety drop door in a fully closed position, in accordance with an embodiment of the invention.

The vehicle door illustrated in FIG. 1 is in a closed position in an aerodynamically designed vehicle 10, and is substantially flush with the generally curved vehicle body sidewall 15. Window 20 extends from the car door panel 5 to the vehicle roof 25. In the present embodiment, the vehicle closure, in transverse section extending from the top of the window 20 to the bottom of door panel 5, in their closed positions, is generally in the form of an arc of a circle.

Figure 2A:
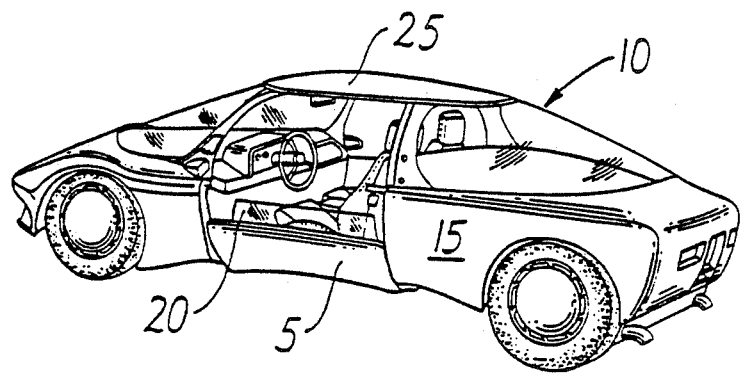
FIG. 2A is a perspective view similar to FIG. 1 with the door panel moved partially under the vehicle body or chassis and the window partially retracted into the door panel.
Figure 2B:
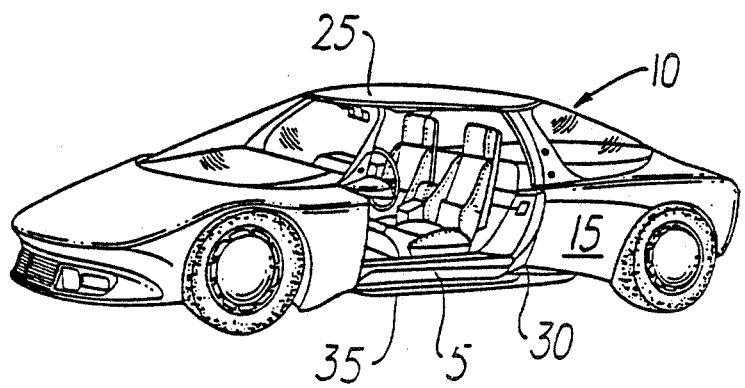
FIG. 2B is also a perspective view similar to FIG. 1 but with the door including door panel and window in a fully open position with the window fully drawn into the door panel.

When the door 5 is in its fully open position, illustrated in FIG. 2B, it is directly underneath the vehicle body 15, i.e. between the bottom of the vehicle chassis 30 and an underpan 35. The side of the passenger compartment of the vehicle 10 is completely open, from the bottom of the vehicle chassis 30 to the vehicle roof 25, thus allowing for easy entrance into and exit from the vehicle. In this open position, the window 20 lies within the door panel 5 and the vehicle chassis 30.

Figure 3:
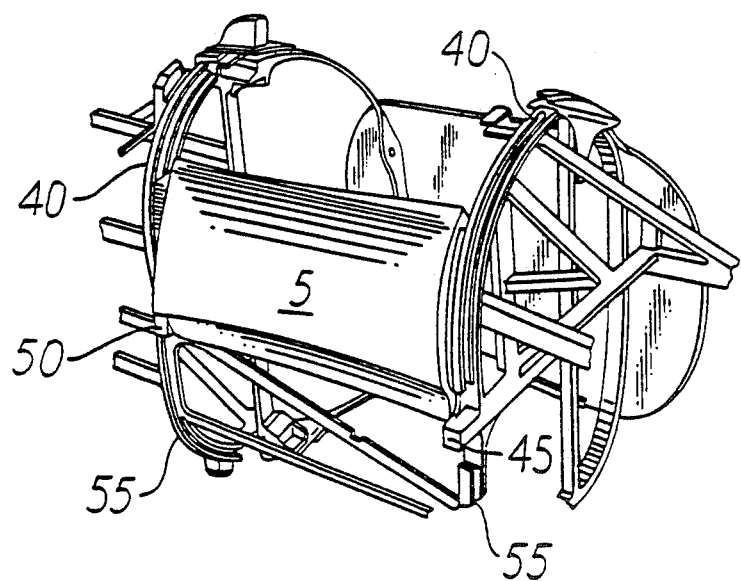
FIG. 3 illustrates an exemplary arrangement of structural members of the chassis supporting the guide rails with the door and window in their fully opened positions, lying underneath the vehicle chassis, in accordance with an embodiment of the invention.

The operation of the closure assembly is more clearly illustrated in FIG. 3. Vehicle door panel 5 is shown in its fully opened position, secured between the guide rails 40. The door 5 is prevented from moving across the bottom of the vehicle by two barrier members 45 and 50, located in the bottom center of the vehicle 10. Guide rails 40 are arched length-wise and L-shaped in cross-section and extend from a position level with the top of door 5 in its closed position to a position abutting the barrier members 45, 50. In the embodiment shown, two pairs of track members 40, 55 are included on opposite sides of the vehicle, each forming a part of a non-concentric circular configuration.

Figure 4:
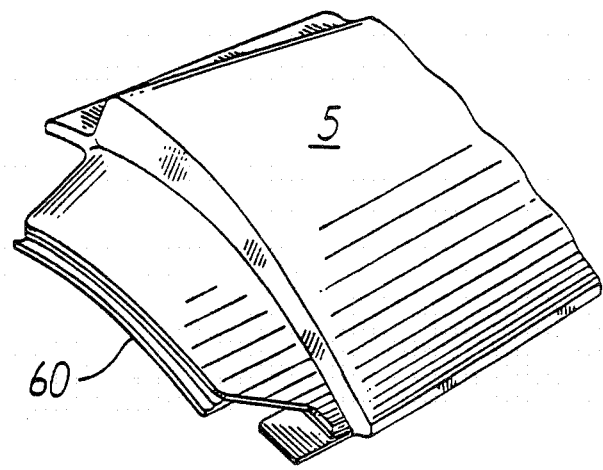
FIGS. 4 and 5 respectively depict exemplary front and rear door track engaging members on the door panel, which are positioned at opposite ends of the door panel.
Figure 5:
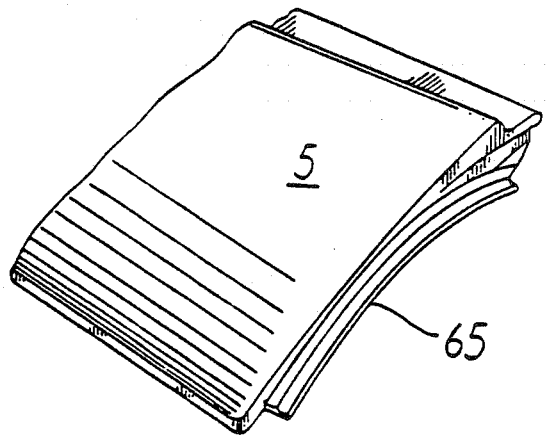

In moving from a closed position to an open position, the door 5 slides along the pair of track members 40 on its lateral ends 60 and 65, shown in FIGS. 4 and 5, respectively. Ends 60 and 65, also L-shaped, are adapted to be securely received by track members 40 through suitable interlocking L-shaped construction. Other appropriate connections between the door 5 and the guide rails 40 may be used.

For example, the track mechanism could be by ball race and small wheels in tracks, as in present horizontally sliding doors found mainly in van applications. They may be constructed of steel, nylon or graphite composites, or any other material with suitable properties of weight, strength and longevity, coupled with ease of design and production along with economic considerations.

Figure 9:
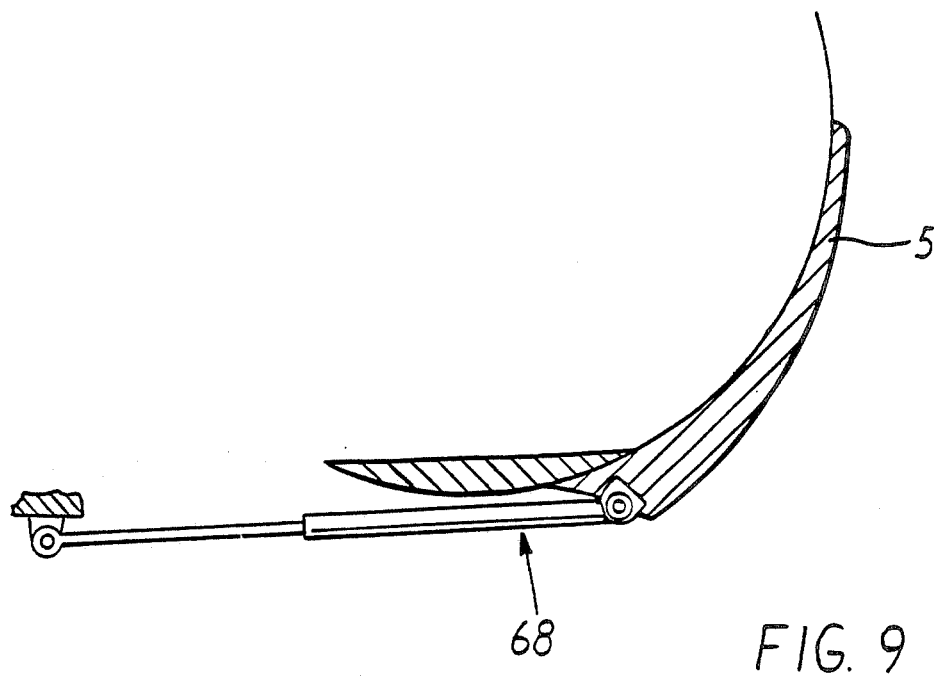
FIG. 9 is a schematic representation of a cross-sectional view through the vehicle floor and a vehicle door panel depicting a conventional counter-balancing component coupling the bottom of the door panel with the vehicle understructure.

A counter-balancing component should be used (FIG. 9), probably in the form of a conventional gas strut 68 as used in present applications for tailgates and 'gull wing' doors. These, anchored perhaps at the 'bottom' of the doors at one end and the underside of the vehicle, between the door tracks, at the other end, would support the weight of the door on the 'downward' or 'opening' movement and would help push up the door on its 'upward' or 'closing' cycle.

The door panel 5 and the side window 20 constituting the parts of a multipart aperture closure means move substantially simultaneously, so that the window 20 is completely retracted into the door panel when the door is in the 'down' or 'open' position (as shown in FIG. 3), and conversely is totally erect when the door panel resumes its 'up' or 'closed' position, by any suitable manual or power operation. For example, this synchronous movement may be achieved in any suitable conventional manner such as by small revolving shafts at right angles to the leading and trailing edges of the door panel 5. Each shaft running in bearings in each edge of the door, would have a pinion on both ends, one to run on a track in the door jamb, and one to run on a track on the edge of the window or retracting window frame if fitted. The gear ratio of the door jamb rack and pinion to the window rack and pinion being calculated so that the time and distance traveled by each component is correct for each particular installation. These racks and pinions may be made of metal, carbon fibre, nylon or rubber compound (as in cogged belts) at the designers discretion. Furthermore, there preferably should be a manual override capability retained on power driven applications in case of power failure.

The door window 20 may be made to operate independently of the door opening mechanism in any conventional manner by a separate crank working a second pinion on the window track, the first pinion being freed from the track by the initial winding of the crank. This second pinion could be geared for normal 2 to 3 revolutions to take the window from the full up to the full down. If the door is 'opened', or rolled 'down', with the window 20 already partially opened, the first window pinion will 'pick-up' the window and roll it down the rest of the way into the door as the door descends, in the usual manner. When the door is closed, the window will now wind all the way back up again to its fully 'up' position.

The manually operated doors may be fitted with suitable conventional power windows, by fitting a small electric motor in the door operated by an electrical switch. This design also lends itself to power operation of the doors themselves in addition to this form of operation for the windows. This could be arranged by placing a heavier duty motor of any suitable type in the door, and running the shaft through the leading and trailing edges of the doors, so that their pinions could mesh with the tracks for door operation in the jams (at floor level, this being the 'mid-point' of the extent of up and down movement for the tracks) and inside the doors on the window track for their simultaneous operation, as in the case of the fully manually operated mechanism. In this case a third pinion on the shafts would be meshed with the window track. This would be of a suitable gear ratio to operate smoothly in 'windows only' mode. The other two pinions (for simultaneous door and window operations) would be disengaged as the shaft is moved laterally to engage the 'window only' pinion (probably by the electromechanical means of a solenoid switch) and operated by a conventional power window switch. An alternative solution may be employed with the motors placed in the door jambs and the shafts and pinions reversed, thus saving weight within the structure of the doors.

Finally, this entire mechanism could be driven in a conventional manner by a suitable hydraulic servo (not shown). If an engine driven servo is used, entry to the vehicle would have to be effected manually, until access to the vehicle is gained and the engine can be switched on. This is not a large problem as dropping the doors to open should require a minimum of physical effort.

The rotary vehicle closure assemblies of the invention can use most known locking mechanisms with little modification, including key, key with central locking system, personalized digital operation and even radio control.

Figure 6:
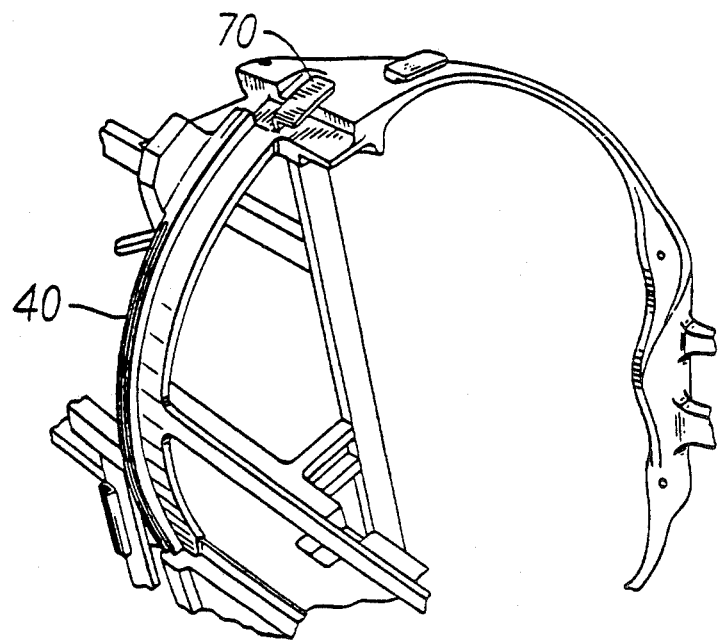
FIGS. 6 and 7 respectively show an exemplary embodiment of the invention in which the front and rear door tracks include flanged locking devices which receive a door structural member as the door closed position is attained.
Figure 7:
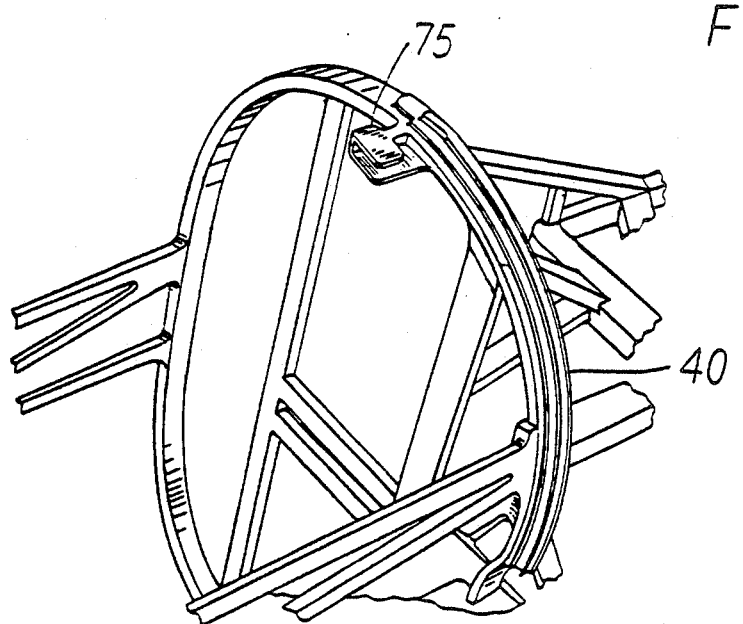
Figure 8:
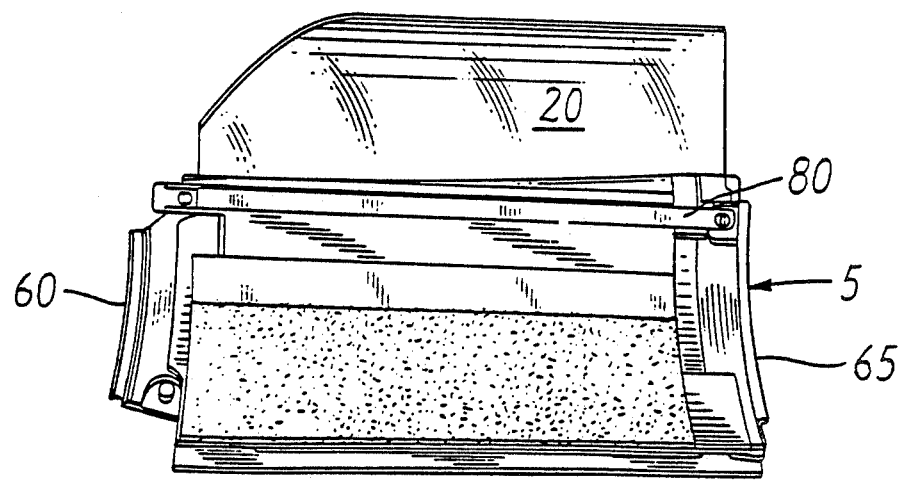
FIG. 8 is an elevational view of the inside of the door with the elongated locking and support member fixed within and projecting beyond the opposite sides of the door, and the window is shown fully raised or withdrawn from the door panel.

In the exemplary embodiments of FIGS. 6, 7 and 8, a strong structural member 80 mounted on the interior of the door panel 5 running transversely across the door opening, within the 'skins' of the door panel, interlocks with downwardly open channels 70 and 75 or other suitable locking devices as it reaches the top of its movement into the 'up' or fully closed position, thus offering greater overall structural integrity for the vehicle than has otherwise been made available by any other entry systems on passenger vehicles. As this structural member can be placed at or near the top of the doors, the door apertures are completely eliminated from the point of view of the vehicle's structural frame as a whole.

In addition, this structural member could be arranged to offer superior protection for the occupants in the event of a 'side-swipe' accident and would not allow the door to 'pop-open' in this or any other kind of accident.

Figure 10:
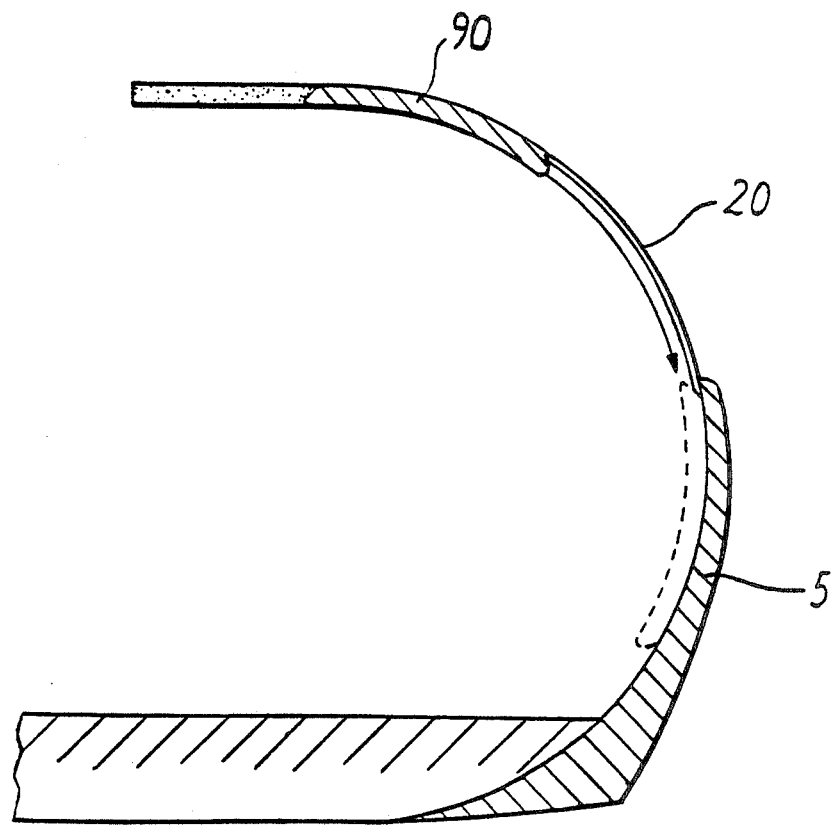
FIG. 10 is a rough schematic representation in section of an alternative embodiment of the invention including a multipart aperture closure means consisting of a door panel, a window and a slidable roof panel positioned alternatively in closed and fully open (dotted outline) position in generally overlying relation to the door panel.

In the alternate embodiment of FIG. 10, sections 90 of the vehicle roof may roll down on separate arcuate tracks (not shown) away from a conventional center "T" bar into slotted or overlying relation alongside the door panel 5, being operated in any suitable manner either manually or with power assist, thus providing the vehicle with a convenient cabriolet (detachable) "top" which could be raised or lowered while the vehicle is in motion and may be withdrawn along with the door panel 5 and window 20 when the door is to be opened.

The aforementioned closure assembly offers several advantages over vehicle doors known in the art, particularly with regard to the safety of other road users and vehicle occupants. For example, accidents associated with projecting doors are avoided since drop doors do not project beyond the vehicle body at any time during their use. Other advantages include: entry or exit from the vehicle in small spaces is easier with vehicles having doors that drop rather than conventional doors since the occupants do not have to squeeze into the small space provided by the outward opening door. Additional space for entry into the vehicle is not necessary, thus allowing vehicles to be parked closer to each other. Furthermore, the often unpredictable and undesirable effects of the highly levered weight of a door hinged on its side in relation to gravitational forces when the vehicle is parked on an inclined or cambered surface is eliminated. If the occupant is disabled, his mobility and independence can be increased by avoiding the hindrance and inconvenience of outwardly opening doors as he moves into and out of the vehicle.

Similarly, since the closure assembly can be used for one long door which extends from a point near the front wheels to a point near the rear wheels of a vehicle, the need for several side doors may be eliminated. The present invention may consequently be applied to ambulances, buses and limousines in addition to ordinary passenger automobiles. Other applications may become apparent in other vehicle types such as trains, boats and aircraft. Additionally, by allowing the vehicle windows to project beyond the bottom of the door when the door is open, the size of vehicle windows need no longer be limited by the depth of the door. This feature eliminates an important overall car design restriction which has placed a limit on the depth of the openable portion of the windows in relation to the height of the vehicle doors. Finally, the cost of manufacture of these doors is substantially similar to he cost of conventional doors due to the low cost of the components.

Although the present invention has been shown and described in terms of the preferred and certain alternative embodiments, it should not be limited to those embodiments or modifications thereof. Further variations and modifications to any particular embodiment will be apparent to those skilled in the art without departing from the scope of the present invention.

For example, from the safety standpoint, a simple micro switch, which would close a circuit enabling operation of the ignition or gearbox only when the door is fully closed in the 'up' position, may be installed. This would prevent the vehicle from being driven on the road with the doors open, a situation which would endanger the occupants in the event of a crash.

Using the same principles of vertically sliding doors around the circumference of arcs formed by the section through the sides of a motor vehicle, it may be found preferable in certain applications to roll the door down underneath the vehicle as described above, while the windows slide up and over the vehicle, either slotting into or locating on top of the roof. It may also be desirable in some instances to reverse the whole procedure and roll the entire door up and over the roof, absorbing the window as before, but as it travels in an upward direction in this instance.

As an adjunct to the foregoing, it is recognized that vehicles equipped with these types of entry systems would lend themselves to easy conversion for unaided operation by a driver who is confined to a wheelchair. It is envisioned that, with the permanent interference of the traditional hinging door in the open position removed, the floor could extend out sideways and drop to the pavement to form a ramp up which a suitable type of wheelchair could be driven. A locking device in the floor could clamp onto the underside of the wheelchair and, if necessary, turn it around through 90 degrees to face the front, while perhaps automatically plugging the wheelchair battery into a recharger, running from the motor vehicle's main electrical systems or supplementary alternator, installed for the purpose. An alternative to the ramp in some applications might be the use of a small elevator, onto which the wheelchair locks and is lifted and moved into position so that the vehicle could be operated in the normal way through converted to 'hands only' operation.

All such modifications and variations are intended to be within the scope of the present invention which is not deemed to be limited except as defined in the following claims.

I claim:

1. A vehicle closure assembly, comprising a vehicle body section having an aperture formed in a generally curved exterior side wall thereof and an arcuate aperture closure door slidably mounted on the vehicle body section and selectively and rotatably movable within the curved exterior vehicle body wall about the circumference of an arcuate path along said vehicle body wall between closed and at least partially open positions with respect to the aperture, said arcuate closure door being of a length sufficient to extend across the aperture when in the closed position, a unitary structural member mounted on and extending transversely across the length of the door, said member having integrally formed distal ends, and means on the vehicle body section to either side of the aperture, said means including downwardly open channels each proportioned for receipt of a respective one or the distal ends of said structural member when the door is in the closed position within the aperture such that compression forces may be transmitted from the vehicle body section longitudinally to the member whereby the door becomes a structurally integral part of the vehicle body section, said structural member sliding into received condition relative to said means, said sliding being responsive to rotational movement of the door from the open position to the closed position.

2. A vehicle closure assembly, comprising an elongated vehicle body section including structural support members forming part of a vehicle frame, said section having an aperture formed in a generally curved exterior side wall, generally arcuate aperture closure means for selectively filling the aperture including a door panel and a relatively moveable window adapted to be interiorly received in said door panel through one end thereof, said support members being disposed to either side of the aperture and having tracks positioned adjacent the aperture for cooperatively engaging and determining the path of movement of said aperture closure means, each said tracked support member being disposed in an arcuate path about a longitudinal axis of rotation having a radius of curvature and extent sufficient to enable the slidable movement of said closure means with respect to the aperture between a closed position within the aperture and an open position displaced from the aperture, a unitary structural member mounted on and running transversely across the length of said door panel, said member having integrally formed distal ends, and means on said support members to either side of the aperture for receiving said structural member, said means including downwardly open channels each proportioned for receipt of a respective one of the distal ends of said structural member when the closure means is in the closed position within the aperture, such that compression forces may be transmitted from the vehicle body section longitudinally to the member whereby said door panel becomes a structurally integral part of the vehicle frame as a whole, said structural member sliding into received condition relative to said means for receiving said structural member, said sliding being responsive to movement of the closure means from the open position to the closed position.

* * * * *

UNITED STATES PATENT AND TRADEMARK OFFICE
CERTIFICATE OF CORRECTION

PATENT NO. : 4,801,172

DATED : January 31, 1989

INVENTOR(S) : John A. Townsend

It is certified that error appears in the above-identified patent and that said Letters Patent is hereby corrected as shown below:

Claim 1 is corrected as follows:

Column 8, line 4, the word "or" is deleted and the word --of-- is substituted therefor.

Signed and Sealed this

Eleventh Day of July, 1989

Attest:

DONALD J. QUIGG

Attesting Officer

Commissioner of Patents and Trademarks